Nov. 4, 1952  J. R. HANSON  2,616,221
GLASS MELTING FURNACE
Filed April 26, 1950  2 SHEETS—SHEET 1

INVENTOR.
Jewell R. Hanson
BY Robert S. Dunham
ATTORNEY

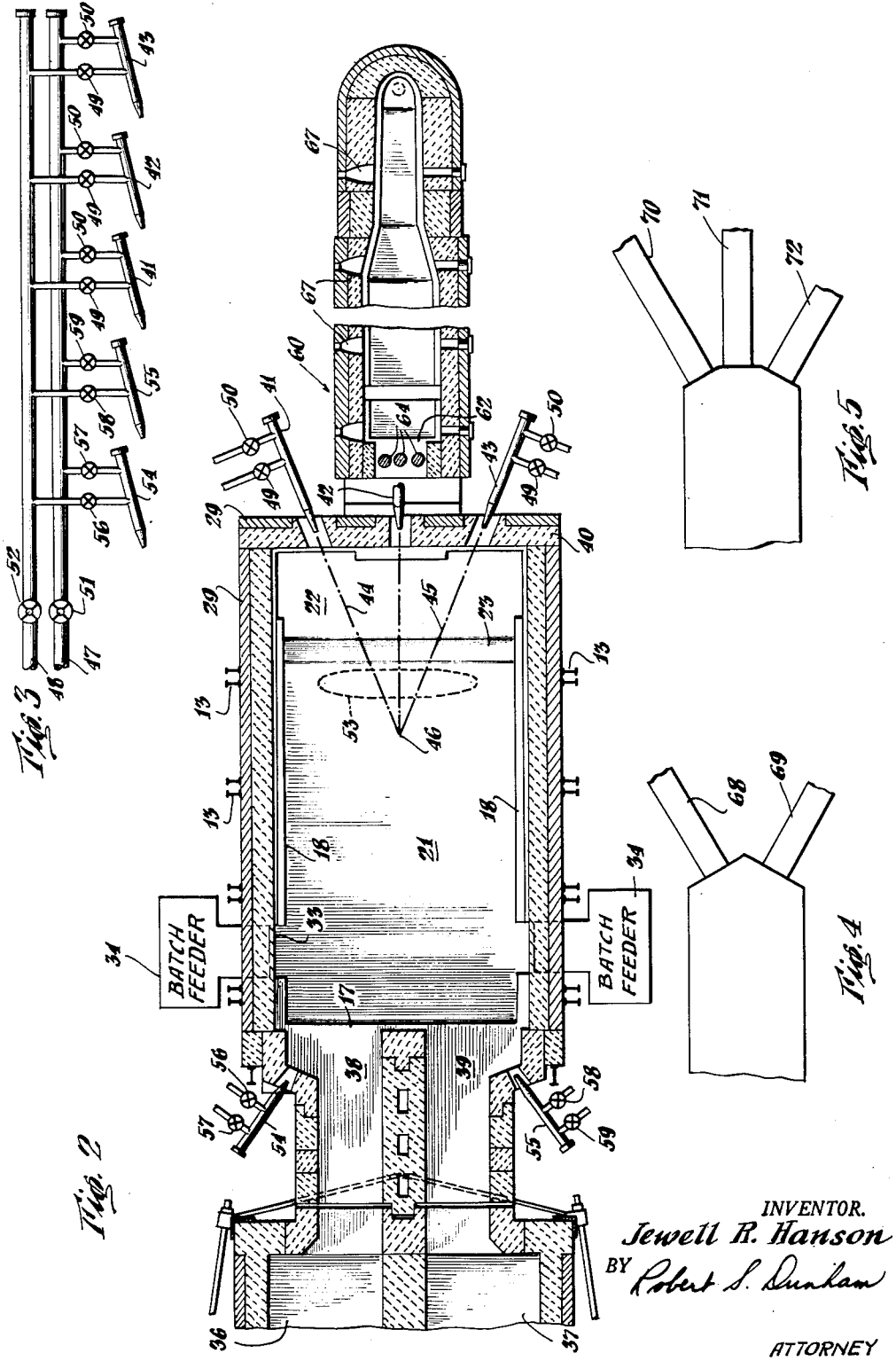

Patented Nov. 4, 1952

2,616,221

UNITED STATES PATENT OFFICE 2,616,221

GLASS MELTING FURNACE

Jewell R. Hanson, Santurce, Puerto Rico, assignor to Puerto Rico Glass Corporation, San Juan, Puerto Rico, a corporation of Puerto Rico Application April 26, 1950, Serial No. 158,149

11 Claims. (Cl. 49—54)

The present invention relates to a glass melting furnace. Particularly the invention relates to improvements in a type of glass melting furnace similar in many respects to the well-known "end fired" furnaces, but wherein the fuel, or at least a part of it, is introduced through the front end of the furnace in substantial opposition to the introduction of combustion-supporting air into the combustion chamber above the bath of molten glass. As a further feature, the present invention provides a glass melting furnace which does not have and is not required to have a so-called "nose" portion or refining zone intermediate the melting zone proper and the one or more forehearths which may be used in conjunction therewith. By eliminating this nose portion, heretofore found necessary in conventional glass furnaces, many difficulties which have arisen in the use and operation of such nose portions are eliminated, while at the same time making it possible to provide a forward wall located above a submerged throat, through which forward wall fuel may be introduced from the front toward the rear portion of the furnace.

As a further feature of the invention, there is provided a submerged throat, the outside portions of which, i. e. the outside of the blocks forming such throat, being exposed to the atmosphere and hence being accessible for cooling, repair or replacement.

A further feature of the invention comprises the provision of a furnace having a submerged throat as aforesaid in which the glass is conducted substantially directly from a single, substantially uninterrupted bath of glass in a melting zone to the channel of a forehearth so that the temperature of the glass almost immediately after leaving the melting zone and throughout its passage through the forehearth may be controlled in a manner which will be independent of temperatures in the melting zone and which may be predetermined in accordance with the use to which the glass is to be put. During the course of the glass from the submerged throat into the forehearth flow channel, it is passed upwardly through a substantially vertical passage or well in which it may be mechanically stirred and homogenized, thus eliminating cords and other defects in the glass.

By the use of some and certainly by all the novel provisions hereinabove outlined, there is provided a glass furnace having a very high melting capacity in respect to the free surface area exposed to the heat of combustion. In addition to this, provision is made as hereinafter set forth in detail for the control of combustion and particularly for the control of the introduction of the fuel as to the direction of such introduction and the distance which the fuel is projected into the combustion chamber, so as to control the position in such chamber of the zone of highest temperature or "hot spot." This in turn serves to control the character and disposition of the thermo-syphon circulatory currents in the glass bath. One of the desirable results of such control of glass currents is that the batch supplied to the tank near the rear end thereof, and which floats upon the molten glass prior to melting, may be held back of the "hot spot" by the rearward flow of the surface currents from the "hot spot" toward the rear end of the tank. In this way an effective separation is maintained between a melting zone proper for the tank and a "refining zone," which may be termed that portion of the tank between the "hot spot" and the forward end thereof. Further in this way the need for a nose portion of the tank is substantially eliminated.

Another feature of the present invention is the substantial elimination of stagnant glass or areas in the tank in which glass may remain stagnant during normal operation. Such stagnant glass, if kept at certain temperatures for a too-long period of time, may be devitrified and/or may be contaminated by dissolved materials possibly from the blocks of which the tank is built, but of a different composition from the rest of the glass in the tank. This causes non-homogeneous glass, cords and the like, in the finished glass, particularly when the pull on the tank is changed. These undesired results are overcome by the tank furnace of the present invention.

Other and more detailed objects and advantages of the apparatus of the present invention will be brought out in greater detail as the description proceeds (and will be pointed out in the appended claims), when read in conjunction with the accompanying drawings in which:

Figure 1 is a view substantially in longitudinal vertical section of a glass melting furnace in accordance with the present invention, the regenerators and the outer end portion of the forehearth being omitted;

Fig. 2 is a view substantially in horizontal section at a level above the normal level for the molten glass of the furnace construction shown in Fig. 1;

Fig. 3 is a diagrammatic illustration showing connections to the several burners and certain of the controls for the fluid fuel and atomizing medium therefor; and Figs. 4 and 5 are fragmentary diagrammatic plan views illustrating a tank furnace in accordance with the present invention with which are associated a plurality of forehearths, two being shown in Fig. 4 and three in Fig. 5.

So-called "end-fired" furnaces for melting glass have been known in the prior art and have been used to some extent commercially. In such furnaces air is introduced through regenerators or recuperators into the rear end of a combustion chamber above a bath of molten glass, the gases passing through the furnace in a substantially U-shaped path, with the U usually arranged horizontally, and the products of combustion passing out of the furnace through the rear end. In such furnaces it has been conventional to supply fuel through the rear end wall of the combustion chamber usually beside and on the outside of the center line of the principal course of air and gases through the furnace. To some extent this same method of firing is used in a preferred form of the present invention.

In the present invention, however, as more particularly hereinafter described, a major portion of the fluid fuel is supplied through the front end wall in a direction generally toward the rear of the combustion chamber and in substantial opposition to the direction of the incoming combustion-supporting air. Such an arrangement was not possible with prior art furnaces for the reason that in substantially all prior art furnaces of a commercial nature known to the applicant it was conventional to provide a melting chamber occupying perhaps 60 to 70 per cent of the horizontal area of the furnace, then a front chamber or nose portion. This nose portion was often separated from the melting portion by a bridge wall, wherein the glass passed from the melting portion to the front end or nose or refining portion through a submerged throat, usually built at a level below that of the floor of the furnace. Some obstruction was usually built above the bridge wall, commonly known as a "shadow wall" and composed of bricks arranged in checker fashion, for permitting some heat to flow from the melting portion to the front end portion or nose, while keeping this portion separate to some extent from the melting portion of the furnace. In such constructions, it was, of course, impossible to place burners above the bridge wall or in the shadow wall to project fluid fuel rearwardly of the melting portion of the furnace as too high temperatures obtained in this portion of the furnace. Burners could also not be placed in front of the nose as then the fluid fuel and products of combustion would not find their way through the shadow wall into the melting portion; and there would result a higher temperature in the nose than in the melting portion which was never desired. It was conventional in the prior art to try to maintain the nose portion at a temperature somewhat lower than that of the melting portion, but still substantially above the temperature at which glass was to be used. With such prior art construction it was found impossible to establish temperatures in the nose portion predetermined in accordance with the desired use for the glass as the temperatures were always a function of and never independent of the temperatures in the melting portion. Furthermore, where there were several feeders operating with a single melting furnace, the temperature in the nose had to be a compromise between the desired temperatures in the feeders respectively and hence exactly appropriate to none in the usual practice. In any case such nose temperatures were always dictated by melting temperatures in conjunction with original furnace construction. In addition to this, as there was seldom any attempt made to supply heat directly and controllably to the nose portion of the furnaces of the prior art, it was quite usual that the actual temperatures existing differed at different portions thereof, with the result that uneven and uncontrolled conditions existed in fact in the glass. There was also in prior art furnaces including such nose portions, stagnant areas of glass, for example in spaces between feeder outlets and below such feeder outlets, wherein glass was permitted to remain for long periods of time; and on occasions, as when the pull was suddenly increased, some of this glass was drawn out along with glass of essentially different composition, giving undesired results (cords) in the final product. Such non-homogeneous glass gave particular trouble when green and amber glasses were being made. In some instances stagnant glass, exposed to substantial temperatures for long periods of time, tended to devitrify, causing the loss of much glass before this condition could be eliminated.

Furthermore, even where an attempt was made in conjunction with a bridge wall construction to provide a hollow space through which cooling air could be passed, it was difficult and usually impossible, and certainly dangerous to attempt to make any repairs or replacement of blocks forming part of the walls of a throat or bridge wall while the furnace was at all hot. As a result, the prior art constructions usually relied upon the initial blocks for these parts until such time as the furnace as a whole was shut down for repairs. This has resulted in an undesired condition and in many instances has resulted in the wear or damage to the throat-forming portion of a furnace being the direct cause of shutting the entire furnace down for substantial rebuilding.

The present invention, on the other hand, provides a throat construction wherein the blocks forming the throat are exposed to the atmosphere on their outsides and thus are easily accessible for cooling, repair or replacement. With throats built in accordance with the present invention as more specifically hereinafter set forth, the throat construction is found to have at least as great a life as the remainder of the furnace, so that it is almost never the initial or sole cause for a shutdown. Even in some instances where replacement of one or more blocks must be resorted to, this may be effected without cooling the furnace, but merely by draining the glass down to the point where the repair must be made and then making the repair with the furnace still hot. This results in practical economies in the operation of glass making furnaces or tanks according to the present invention.

In the accompanying drawings there is illustrated in Figs. 1 and 2 a relatively small unit type glass melting tank furnace embodying the present invention. The furnace shown in the drawings is one which in one practical embodiment has a main melting area 7' x 16' giving a total area of 112 square feet. Notwithstanding its small size, and the particular furnace described was used with but a single feeder, this furnace has made excellent glass at the rate of about 24 tons per day for a continuous period of a week and has been used for substantially longer periods at lower ratings. Thus this furnace has made glass with a melting area of only about 4½ square feet per ton-day, which compares with the average in the industry of about 6.8 square feet per ton-day. While certain modifications will be referred to as the present description proceeds, the description of the particular furnace above referred to is that of a presently preferred embodiment of the invention and is illustrative of the principles thereof.

As shown, the furnace may be mounted upon a suitable support, usually of structural steel and including a plurality of uprights 10, longitudinally extending beam members 11, transverse beams 12 and vertically disposed buck stays 13. This construction, which may be substantially conventional in character, is shown only diagrammatically in the accompanying drawings.

The lower portion of the furnace, as in conventional glass furnaces, is formed as a tank generally indicated at 14 for containing a bath or body of molten glass shown at 15, the glass normally being maintained up to a predetermined level indicated at 16. This tank portion 14 of the furnace includes a rear end wall 17, side walls 18 and a front end wall 19. It further includes a bottom construction generally indicated at 20, having two substantially complementary portions arranged at different levels, including a lower portion 21 and an upper portion 22 which meet at an inclined step 23, the step extending transversely of the tank.

While the particular materials of which the tank is constructed form per se no part of the present invention, and may be of any conventional type, it has been found satisfactory to use clay flux blocks for the bottom 20, while using a more expensive material such as fused silica-alumina blocks for the side walls 17, 18 and 19. The usual tuck stones indicated at 24 may be provided as generally illustrated and for the usual known purpose.

Above the body of glass 15 there is constructed side and end walls and a roof or crown in accordance with conventional practice in glass furnaces. This construction defines a combustion chamber generally indicated at 25. The construction above the glass line 16 may be of silica brick on the inside as indicated at 26 for the crown; while suitable insulating means may be provided including, for example, a layer 27 of granular material as Potter's flint, and an outer layer of suitable insulating brick indicated generally at 28. The side and/or end walls may similarly be provided with insulating brick layers or courses as indicated at 29, Fig. 2.

Further, as is usual in furnaces subjected to high temperatures, including glass furnaces, suitable means may be provided for expansion, including, for example, the means indicated diagrammatically at 30 in Fig. 1 for the side walls, and expansion joints shown between the sides and crown and the end walls at 31 in that figure. It will be understood that once the furnace has been brought substantially up to temperature, any openings remaining may be suitably plugged as generally indicated at 32, Fig. 1.

While it is contemplated that glass making batch may be supplied to the furnace at one or more points, and either manually or automatically, there are shown laterally recessed portions generally indicated at 33, with each of which may be associated a conventional automatic batch feeding device 34. In lieu of this construction, the bays or "dog houses" of the prior art and manual feeding may be resorted to if desired. The details of the feeding apparatus and means per se form no part of the present invention, except that some such means must be provided at one or more points, preferably adjacent to the rear end of the tank construction. For this reason the batch feeders 34 are shown merely diagrammatically and are each identified by the legend "Batch feeder."

As is usual in furnaces of this type, one or more apertures are provided as indicated at 35 for observation, the taking of samples of glass, the insertion of means for temperature detection or indication or for any other purpose. While a considerable number of such openings are shown in Fig. 1, it will be understood that any desired number may be used and disposed and distributed about the combustion chamber at any desired points.

Due to the fact that temperatures must be established and maintained within this furnace well over 2000° F., as hereinafter more particularly set forth, it is usual to employ preheated air for supporting combustion of the fuel. The present invention contemplates such an arrangement either by employing recuperators, which have been known to the art for some time, or regenerators, which are the more common and which are hence chosen for purposes of illustration in this case. Inasmuch as regenerators are well known for high temperature furnace work, both as to their construction and mode of operation, including periodic reversal, the regenerators in the present case have been indicated merely diagrammatically at 36 and 37 in Fig. 2. As in the usual case in prior art end-fired furnaces, the regenerators communicate with the combustion chamber through similar ports 38 and 39 arranged side by side on the same level and communicating with the combustion chamber 25 through the rear end wall thereof. It will be understood that any suitable or conventional construction may be employed for the regenerators and for their reversing valve means, stacks, ducts and other equipment normally used therewith and that such means per se form no part of the present invention.

The description of the furnace given thus far is substantially all conventional with the possible exception of the relation of certain features referred to hereinabove in respect to other features later to be described.

An important feature of the present invention, however, is the manner of bringing in all or a substantial and usually a major portion of the fuel. This fuel in glass melting practice is almost always fluid fuel, as this type, including both gas and oil, has little or no ash content and hence will not contaminate the glass being melted. In accordance with this invention, the front wall 40 of the combustion chamber is provided with one or more burners, which are arranged to project fluid fuel through this wall. As shown three such burners may be provided as illustrated at 41, 42 and 43 (see also Fig. 3). While the particular number of burners is not critical, it is usually preferred that one or more burners be provided in an arrangement which will be substantially symmetrical in respect to the longitudinal center line of the tank or furnace. It is further preferred that any burners positioned laterally of such center line, for example the burners 41 and 43 be arranged to project fuel diagonally toward a predetermined point on the center line as indicated in Fig. 2 by the dotted lines 44 and 45, which it will be noted intersect at a predetermined point 46 in the tank. The arrangement of the burners is such that the fuel is projected generally rearwardly of the combustion chamber or toward the rear end thereof and in substantial opposition to the direction of movement of the incoming combustion-supporting air supplied to the combustion chamber through either of the ports 38 or 39. Each burner as shown may be supplied not only with fluid fuel (gas or oil), but also with a carrying or atomizing medium, such as compressed air or steam. As shown diagrammatically in Fig. 3, each burner is supplied with fluid fuel from a duct or header 47, and is also supplied with an atomizing or carrying medium, such as compressed air, from a header 48. Further, as shown, the amount or pressure of such fluid fuel and/or atomizing medium may be controlled as to each burner by valves as shown at 49 and 50 for the burners 41, 42 and 43.

It is contemplated in accordance with the present invention that all the fuel may be supplied through the forward burner, as burners 41 to 43 that have been described. When this is done, and whether or not there be any other fuel supplied, it is the preferred mode of operating the furnace of the present invention to cut off the flow of fuel at least during the actual reversal period of the regenerators. This may be done for example by cutting off a valve 51 in the fuel duct or header 47. If desired, during this period the atomizing medium may be permitted to flow continuously; or such medium may be similarly cut off by a master valve 52 in the air duct or header 48.

While the several valves herein shown diagrammatically may be provided in practice substantially as shown, it is usually preferred in a commercial installation to arrange the controls for reversing the regenerators adjacent to the controls for the fuel and/or air or other atomizing fluid, so that some suitable interlocking means may be provided to prevent undesired operation as to the sequence of the operations of the several valves used in effecting a reversal of the flow through the regenerators. Inasmuch, however, as such interlocking valve arrangements are known in the art and as they form per se no part of the present invention, they have not been illustrated in detail and will not be further described.

Another feature of the control of the burners is the provision of means whereby the force or distance with which the fuel is projected into the combustion chamber may be suitably controlled, so as to assist at least in locating the position in the combustion chamber of the zone of highest temperature or "hot spot." One such position for this zone is shown in dotted lines in Fig. 2 at 53. It will be noted that this zone is located somewhat forwardly of the point of intersection 46 of the lines of projection of the burners 41 and 43. This may be correct for the reason that the incoming air moves in opposition to the direction of projection of the fuel, considered generally. As such, the zone wherein the maximum amount of heat is released by combustion of the fuel will be located somewhat forwardly of the point to which the fuel would be projected were it not for the air flowing substantially countercurrent thereto.

It will further be understood that the location of the zone of highest temperature or "hot spot" in the tank is a function of a number of things, including the velocity and the amount of combustion-supporting air flowing into a tank, the velocity and amount of fuel and atomizing medium supplied thereto, the rate at which relatively cold batch is being supplied to the tank, the rate of pull on the tank or withdrawal of finished glass therefrom, and possibly other variables. It is, however, very important in practice to control the position of this "hot spot" within certain limits, as this in turn controls the character and disposition of circulatory convection currents or thermosyphon circulation currents in the glass. In practice it has been found that the glass wells upwardly at and adjacent to the "hot spot" in the tank, thence flows at and near the surface of the glass, outwardly away from the hot spot, in a more or less radial manner toward the cooler side walls in the tank, and thence downwardly to be recirculated as aforesaid. Thus by establishing a hot spot or zone substantially as indicated in Fig. 2, it is possible to establish and maintain a very effective barrier against movement of floating unmelted batch forwardly of this zone or "hot spot." It is also possible to keep relatively unrefined glass from passing beyond the hot spot, so that the quality of the glass as finally produced will be maintained at a desired standard. The location of the hot spot is assisted by the presence of the step 23 in the tank bottom and by its location in the tank, as there will be circulatory currents adjacent to the step to some extent at least as indicated by the arrows in Fig. 1. The hot spot will usually and preferably be located adjacent to and preferably just rearwardly from the location of the step 23 under normal operating conditions substantially as shown in Figs. 1 and 2. In practice, the location of this hot spot is controlled to a substantial extent at least by the control of the fuel and air to the burners 41, 42 and 43.

In some instances it may be desired to supply some fuel adjacent to the air inlet ports 38 or 39. As shown, for example in Fig. 2, burners may be provided at 54 and 55. It will be understood that these burners may be similar in construction and mounting to those now used in conventional "end fired" furnaces in that supply of fuel thereto is reversed concurrently with the reversal of the regenerators. Thus when air is being supplied to the combustion chamber through port 38 and products of combustion are being exhausted through port 39, the burner 54 will be supplied with fuel, while no fuel will be projected into the combustion chamber through the burner 55. Burners 54 and 55 are shown in Fig. 3 as being supplied from the same headers 47 and 48 as the burners 41—43, but are shown provided with separate and independently controllable valves 56 and 57 for burner 54, and 58 and 59 for burner 55. These valves are intended diagrammatically to illustrate any valve means used in conjunction with these burners for effecting reversal of the operation thereof in a substantially conventional manner with the regenerators and also for controlling the amount and velocity of fuel and atomizing medium injected by and through the respective burners.

When rear burners as 54 and 55 are used in conjunction with one or more front burners, there is preferably effected a balance between the fuel introduced from the rear and from the front, so as to determine the location longitudinally of the tank of the hot spot or zone of highest temperature for reasons hereinabove set forth. While the means herein shown for controlling the several burners are merely diagrammatically illustrated, it will be understood that by suitable control of such means or equivalent means capable of effecting differential control of the fore and aft firing, the hot spot may be positioned as desired for any given set of conditions to which the tank may be subjected from time to time.

When only front firing is used, for example through the burners 41—43, and burners 54 and 55 are eliminated, which is one of the modifications contemplated in accordance with the present invention, the construction may be substantially simplified in respect to what has been required in the building of conventional "end fired" furnaces. Furthermore, when only front firing is used, the burners are always in use except during the actual reversals of the regenerators and then are cut off only to keep the furnace from being flooded with fuel. Thus it will be unnecessary to supply air to the combustion chamber through the burners merely to cool the burners during at least half the time when they are not being used. This is one of the undesirable features of conventional end fired furnaces. It will be understood that the air so passed through the burners to keep them from being melted down will dilute and cool the outgoing gases and hence diminish the amount of heat which may be saved by the regenerators operating in their ordinary manner. Solely front firing further simplifies problems of construction and furnace design to some extent in a manner which is not available when rear firing is used alone or in conjunction with front firing and also avoids the possibility of "short-circuiting" of the highly heated products of combustion, before they have had a chance to give up a part of their heat to the glass or to the glass making materials.

When some or a major part of the fuel is supplied through the front wall and some fuel is supplied through the rear wall, certain of the disadvantages of prior art end fired furnaces are obviated or overcome, even though some still remain. It has been found, for example, that a furnace using front firing alone or in conjunction with some rear firing as explained above, operates under a more constant pressure and with a more consistent flow of combustion air and fuel and hence is more stable in practice than with any heretofore conventional system of firing.

It will further be noted, particularly from Fig. 1, that the burners 41 to 43 and substantially the entire front wall 40 of the combustion chamber are exposed and accessible during the operation of the furnace so, for example, as to enable burners to be changed when it becomes necessary or for other repairs or replacements to be made.

Another major feature of the furnace of the present invention is the provision of a submerged throat and passage directly from a single, substantially uninterrupted body of glass in a tank or melting chamber beneath a single combustion chamber to the rear end portion of a forehearth, thus eliminating completely the conventional front end portion or chamber or nose of the conventional furnaces, which have been and are in use in accordance with the prior art. In this way glass passes through a relatively short submerged passage directly from a single body of glass in the tank to the forehearth. In the tank prior to passing through the submerged throat, the glass is exposed to melting temperatures in the tank and is conventionally maintained at a temperature (for ordinary flint glass) of about 2675° to about 2700° when the pull on the tank is relatively low, for example about eleven tons per day in a tank of the dimensions hereinabove given, and a temperature of about 2750° to about 2800° when the pull is relatively high, for example about twenty-five tons per day in the particular tank aforesaid. It will be understood that temperatures of melting are also a function of glass composition, heat resistant glasses, for example, usually requiring substantially higher temperatures. In the forehearth in accordance with the present invention temperatures may be controlled by means which have been and are conventional for use in forehearths, so that the glass is kept for a short and minimum time only in a place wherein its temperature is not accurately and carefully controlled. This contrasts with prior art tanks, wherein substantial volumes of glass could remain stagnant for great lengths of time, causing some of the difficulties above referred to. Furthermore in accordance with the present invention, each forehearth is connected to the main body of glass in the tank through its own relatively short communicating passage including a submerged throat for each forehearth respectively. Thus when there are a plurality of forehearths as shown in Figs. 4 and 5, in lieu of a single forehearth shown in Fig. 1, each forehearth will have its own submerged throat and homogenizing well as are described hereinafter in respect to the forehearth generally indicated at 60, Fig. 1.

Referring now to Figs. 1 and 2, a submerged throat or passage is shown at 61 communicating with a lower portion of the body of glass 15 in the tank and disposed at a level such that the bottom of the throat 61 is in effect a prolongation of, or on the same level as, the bottom portion 22 of the tank. This submerged throat communicates at its forward end with the lower end portion of a well 62, through which the glass passes upwardly to the conventional glass flow channel 63 of the forehearth 60. During this upward movement, the glass may be subjected to a mechanical stirring action by one or more stirrers, shown as vertically disposed rotatable rods 64, each having a helical vane or rib 65 thereon and arranged to be driven by some suitable rotating means 66 from a source of mechanical power (not shown). It is noted that the stirring action is applied to the glass during its substantially vertical flow, rather than during a horizontal flow of the glass, so that the stirring action tends to assist in the flow as well as homogenizing the glass and thus tends to eliminate even the possibility of cords or other defects due to non-homogeneity of the glass. The mechanical stirring, however, is optional in the present case as the furnace has in fact been proven capable of producing good quality commercial glass without such stirring. The invention is to be measured accordingly.

It is noted that the submerged throat 61 and the well 62 are formed from suitable blocks, for example of the same fused alumina-silica composition as glass contact portions of the side walls, which blocks are exposed on their outsides for cooling, repair or replacement. This provides a novel and extremely useful construction for submerged throats, in that the throat is no longer a "bottleneck" in the construction of the furnace as a whole, but rather in a practical construction will outlast the remainder of the tank. Even if replacement or repair must be effected, these acts may be done generally without cooling or complete draining of the tank. In the event that replacement of one or more blocks in or around the throat is required, the tank need not be cooled as an entirety, but merely drained to the necessary extent to permit removal and replacement of the blocks which require such treatment.

The outwardly exposed submerged throat is peculiarly useful not only in a glass melting furnace or tank, wherein it may be used beneath an exposed forward wall as shown and wherein all or a major part of the fuel may be supplied through such forward wall, but also is useful in tanks otherwise fired, for example transversely fired tanks as are in common use in the prior art. The essential feature, however, is that such a throat may be provided and employed only where the nose portion of the tank is eliminated and where there is a direct flow channel from the main body of the tank to the forehearth. On the other hand, by using an exposed throat as aforesaid, it is possible to provide an outwardly exposed front wall through which front firing may be effected in opposition to air introduced through the rear end of the combustion chamber as aforesaid.

In conjunction with the forehearth and in effect intermediate between the forehearth proper and the glass melting area heretofore described there is provided what may be termed a transition zone, which is immediately above and adjacent to the well 62. This zone, in the space above the glass level is substantially separated from the space in the remainder of the forehearth above the glass by a mantle block 74, which is suitably secured in position in the forehearth construction and terminates at its lower edge immediately above the glass surface, for example about an inch. In this way the mantle block is kept from being attacked chemically by the glass and yet serves substantially to separate the spaces above the glass in front of and in rear of this mantle block. The space above the glass to the rear of the mantle block may be provided with temperature conditioning means, preferably independent of the means used in the remainder of the forehearth or the forehearth proper. As such there is provided a burner opening 75, through which either hot products of combustion or a cooling medium, such as cooling air, may be introduced into the space. Suitable exhaust means (not shown) are provided for this space above the glass. It will be understood that suitable intermediate temperature conditioning will be carried on in this portion of the entire apparatus in a manner which will be independent of the temperature control in the furnace proper and also of the temperature control in the forehearth proper. The construction of this portion of the apparatus may in general be a prolongation of the forehearth construction.

The forehearth construction per se may be considered to be substantially conventional. As shown there are a plurality of openings 67, through which heated gases may be supplied from burners or the like or through which a cooling gaseous medium may be supplied in the event that it is desired to cool the glass at a particular zone along the forehearth. Suffice it to say that the forehearth will be so arranged that glass will be temperature-conditioned during its flow therethrough in accordance with the use to which the glass is to be put. This will in practice be controlled by the type and weight ware being made or such other use as may be made of the glass. Inasmuch as this temperature control in a forehearth is now conventional in the art relating to forehearths, it will not be described in greater detail. It will be assumed, however, that suitable means (not shown) will be provided in conjunction with the forehearth 60 for effecting all desired results in this respect.

In order that the advantages of the present invention may be attained when there are two forehearths as shown at 68 and 69 in Fig. 4, the furnace may be constructed as diagrammatically illustrated in that figure, so that the forehearths diverge from the center line of the tank, preferably symmetrically and preferably each at about a 30° angle. This angle, however, is not critical, but is dictated primarily by a desire to afford ample space for forming machines or other equipment such as is conventionally located adjacent to the outer ends of forehearths. If desired, the forehearths could be arranged parallel to one another. In Fig. 5 three forehearths are shown at 70, 71 and 72 in a symmetrical arrangement and with the forehearths 70 and 72 disposed at about 30° angles to the center line of the tank.

What is important from the point of view of the present invention, however, is that when there are one or more forehearths, each will be provided with its own individual submerged throat as shown at 61 in Fig. 1 and with its individual well shown at 62. Stirring means may or may not be used as desired.

While the dimensions of the glass melting tank are not critical according to the present invention, some of the dimensions of one tank which has been built and successfully operated in accordance with the present invention will be of interest as illustrative of a specific example thereof. In this tank which had a melting area 7 x 16 feet as aforesaid, the glass was maintained at a level about 3½ inches below the bottom of the tuck stones 24, Fig. 1. The drawings, Figs. 1 and 2, are approximately scale drawings for this particular tank. The step 23 is about twelve inches in vertical height, the submerged throat 61 is about six inches in vertical height and about two feet wide, although these dimensions are not at all critical. The well 62 is sixteen inches in a direction longitudinally of the tank, i. e. from right to left as seen in Fig. 1 and the depth of glass from the common level of the bottom portion 22, the submerged throat 61 and the well 62 to the glass surface is about one foot, nine and one-half inches, the glass level being maintained about one inch below the top surface or line indicated at 73, Fig. 1, of the glass contact blocks forming the glass flow channel of the forehearth 60. The horizontal cross sectional area of the well 62 is preferably not over about three times that of the submerged throat 61, so that this well is by no means equivalent to the relatively large area usually found in the front portion or nose of a conventional tank.

While there is herein shown and described but one principal embodiment of the invention and certain specific details of one example of this embodiment have been given, some of the possible modifications have been suggested herein and other modifications and equivalents will be apparent to those skilled in the art from the foregoing particular description and the accompanying drawings. I do not wish to be limited, therefore, except by the scope of the appended claims, which are to be construed validly, as broadly as the state of the prior art permits.

What is claimed is:

1. A glass melting furnace, comprising a tank for containing a bath of molten glass, means forming a combusion chamber above said tank, means for supplying glass making materials to said tank adjacent to the rear end thereof, means for supplying combustion-supporting air from the rear end of said combustion chamber and in a direction toward the front end thereof, means for the withdrawal of products of combustion from and communicating with the rear end of said combustion chamber, so that gases flow in a substantially U-shaped path through said combustion chamber, means for supplying a combustible fluid fuel through the front end of said combustion chamber and directed generally toward the rear end thereof for supplying at least a major part of the heat requirements of said furnace, and means for withdrawing glass from the front end of said tank for use.

2. A regenerative glass melting furnace, comprising a tank for containing a bath of molten glass, means defining a combustion chamber above said tank, means for supplying glass making materials to said tank adjacent to the rear end thereof, a pair of regenerators arranged for periodic reversal of flow and communicating with the rear end of said combustion chamber through similar ports arranged side by side and substantially symmetrically in respect to the rear end of said tank, said regenerators being alternately usable to supply combustion-supporting air to said combustion chamber, so that gases flow in substantially horizontal U-shaped paths through said combustion chamber, passing into said combustion chamber through one of said ports and out the other one with periodic reversals in flow directions, fluid fuel burner means arranged symmetrically of a front wall portion forming a part of said combustion chamber defining means for projecting fluid fuel into said combustion chamber from the front generally toward the rear end thereof in substantial opposition to combustion-supporting air introduced into said combustion chamber through one of said ports, said burner means being operative during both directions of flow through said regenerators, and means for withdrawing glass from the front end of said tank for use.

3. A glass melting furnace, comprising a tank for containing a bath of molten glass, means forming a combustion chamber above said tank, means for supplying glass making materials to said tank adjacent to the rear end thereof, means for supplying combustion-supporting air from the rear end of said combustion chamber and in a direction toward the front end thereof, means for the withdrawal of products of combustion from and communicating with the rear end of said combustion chamber, so that gases flow in a substantially horizontal U-shaped path through said combustion chamber, a plurality of burners arranged and disposed to project fluid fuel into said combustion chamber from the front and directed generally toward the rear thereof in paths which intersect substantially on the longitudinal center line of said combustion chamber and at a point on such center line spaced a predetermined distance from the front of said combustion chamber, the direction of fuel projection from said burners tending in part at least to predetermine the position of a zone of highest temperature in said combustion chamber, so as to control the thermo-syphon circulation in a bath of molten glass in said tank, and means for withdrawing glass from the front end of said tank for use.

4. A regenerative glass melting furnace, comprising a tank for containing a bath of molten glass, means defining a combustion chamber above said tank, means for supplying glass making materials to said tank adjacent to the rear end thereof, a pair of regenerators arranged for periodic reversal of flow and communicating with the rear end of said combustion chamber through similar ports arranged side by side and substantially symmetrically in respect to the rear end of said tank, said regenerators being alternately usable to supply combustion-supporting air to said combustion chamber, so that gases flow in substantially horizontal U-shaped paths through said combustion chamber, passing into said chamber through one of said ports and out the other one with periodic reversals in flow directions, fluid fuel burner means arranged symmetrically of a front wall portion forming a part of said combustion chamber defining means for projecting fluid fuel into said combustion chamber from the front generally toward the rear end thereof in substantial opposition to combustion-supporting air introduced into said combustion chamber through one of said ports, said fluid burner means being operative during both directions of flow through said regenerators, at least one fluid fuel burner arranged adjacent to each of said ports in the rear of said combustion chamber for alternately projecting additional fluid fuel into said combustion chamber substantially concomitantly with the alternate introduction of combustion-supporting air through the respectively adjacent ports and in directions from the rear toward the front of said combustion chamber, and means for withdrawing glass from the front end of said tank for use.

5. A regenerative glass melting furnace in accordance with claim 2, comprising in addition, means for cutting off the supply of fluid fuel to said fuel burner means during the reversal of gas flow through said regenerators, whereby the same burner means may be operated at all times except during such reversals of gas flow.

6. A glass melting furnace, comprising a tank for containing a bath of molten glass, means forming a combustion chamber above said tank, means for supplying glass making materials to said tank adjacent to the rear end thereof, means for supplying combustion-supporting air from the rear end of said combustion chamber and in a direction toward the front end thereof, means for the withdrawal of products of combustion from and communicating with the rear end of said combustion chamber, so that gases flow in a substantially horizontal U-shaped path through said combustion chamber, burner means for projecting fluid fuel through the front end of said combustion chamber and directed generally toward the rear end thereof, means for supplying fluid fuel to said burner means, means to control the flow of fluid fuel to and through said burner means for controlling the projection of fuel into the combustion chamber, so as at least partially to control the location of the zone of highest temperature in the combustion chamber and thereby to control the thermo-syphon circulation in a body of molten glass in said tank, and means for withdrawing glass from the front end of said tank for use.

7. A regenerative glass melting furnace, comprising a tank for containing a bath of molten glass, means defining a combustion chamber above said tank, means for supplying glass making materials to said tank adjacent to the rear end thereof, a pair of regenerators arranged for periodic reversal of flow and communicating with the rear end of said combustion chamber through similar ports arranged side by side and substantially symmetrically in respect to the rear end of said tank, said regenerators being alternately usable to supply combustion-supporting air to said combustion chamber, so that gases flow in substantially horizontal U-shaped paths through said combustion chamber, passing into said chamber through one of said ports and out the other one with periodic reversals in flow directions, fluid fuel burner means arranged symmetrically of a front wall portion forming a part of said combustion chamber defining means for projecting fluid fuel into said combustion chamber from the front generally toward the rear end thereof in substantial opposition to combustion-supporting air introduced into said combustion chamber through one of said ports, said burner means being operative during both directions of flow through said regenerators, at least one fluid fuel burner arranged adjacent to each of said ports for respectively and alternately projecting fluid fuel into said combustion chamber substantially concomitantly with the alternate introduction of air through the respectively adjacent ports and in directions from the rear toward the front of said combustion chamber, means for supplying fluid fuel and an atomizing fluid to said fluid fuel burner means which are arranged symmetrically of said front wall and also to said fluid fuel burners arranged adjacent to said ports, means for selectively differentially controlling the supply of fluid fuel and atomizing fluid to said fluid fuel burner means in respect to such supply to said fluid fuel burners, tending to control the position longitudinally of said combustion chamber of the zone of highest temperature, so as to control the thermo-syphon circulation in a bath of molten glass in said tank, and means for withdrawing glass from the front end of said tank for use.

8. A regenerative glass melting furnace, comprising a tank for containing a bath of molten glass, means defining a combustion chamber above said tank, a pair of means for supplying glass making materials to said tank adjacent to the rear end thereof and similarly disposed on opposite sides of the tank, a pair of regenerators arranged for periodic reversal of flow and communicating with the rear end of said combustion chamber through similar ports arranged side by side and substantially symmetrically in respect to the rear end of said tank, said regenerators being alternately usable to supply combustion-supporting air to said combustion chamber, so that gases flow in substantially horizontal U-shaped paths through said combustion chamber, passing into said chamber through one of said ports and out the other one with periodic reversals in flow directions, fluid fuel burner means arranged symmetrically of a front wall portion forming a part of said combustion chamber defining means for projecting fluid fuel into said combustion chamber from the front generally toward the rear end thereof in substantial opposition to combustion-supporting air introduced into said combustion chamber through one of said ports, said burner means being operative during both directions of flow through said generators, at least one fluid fuel burner arranged adjacent to each of said ports for respectively and alternately projecting fluid fuel into said combustion chamber substantially concomitantly with the alternate introduction of air through the respectively adjacent ports and in directions from the rear toward the front of said combustion chamber, means for supplying fluid fuel and an atomizing fluid to said fluid fuel burner means which are arranged symmetrically of said front wall portion and also to said fluid fuel burners arranged adjacent to said ports, valve means associated with all said fluid fuel burner means and said fluid fuel burners and operable to cut off flow of fluid fuel during the reversal of flow through said regenerators, and also operable so as to supply fluid fuel to said fluid fuel burners alternately with said reversals, so that fluid fuel will be supplied to said fluid fuel burners only on the side of said tank into which air is being supplied from one of said regenerators and so that said fluid fuel burner means will be supplied with fluid fuel whenever air is being supplied to said combustion chamber through either of said regenerators, said valve means further being selectively differentially controllable to control the supply of fluid fuel and atomizing fluid to said fluid fuel burner means in respect to such supply to said fluid fuel burners, tending to control the position longitudinally of said combustion chamber of the zone of highest temperature, so as to control thermo-syphon circulation in a bath of molten glass in said tank, and means for withdrawing glass from the front end of said tank for use.

9. Glass making furnace apparatus, comprising a tank in which glass making materials are melted to form molten glass and including side walls and a bottom for containing a single, substantially uninterrupted body of molten glass, means for supplying glass making materials to the rear end portion of said body of molten glass, means for supplying heat to the glass in said body and for melting glass making materials supplied thereto, a forehearth through which finished glass is drawn from said body of molten glass, means defining a flow passage from said tank to said forehearth, the last named means including means defining a submerged throat communicating directly with the body of glass in the tank, and a well communicating directly at its lower portion with the forward end of said throat and at its upper portion directly with a glass flow channel in said forehearth, and a plurality of vertically disposed stirring means, each having a substantially helical rib thereon and extending into said well for mechanically stirring the glass tending to homogenize it, while assisting the vertical flow of the glass upward in said well.

10. A glass melting furnace, comprising a tank for containing a single, substantially uninterrupted body of molten glass, means including a rear wall, side walls, a forward wall and a crown forming a combustion chamber above said tank, means for supplying glass making materials to said tank adjacent to the rear end thereof, means for supplying combustion-supporting air through said rear wall and in a direction toward the front end of said combustion chamber, means for the withdrawal of products of combustion from said combustion chamber through said rear wall, so that gases flow in a substantially U-shaped path through said combustion chamber, a forehearth having a channel through which molten glass passes from the body thereof in said tank to a point of use, passage means including a submerged throat beneath said forward wall communicating directly with the lower portion of said body of glass and a passage having at least a vertical component of direction for directly connecting said throat with the glass channel in said forehearth, whereby the outside of said forward wall is directly exposed to the atmosphere and is accessible during the operation of said furnace, and burner means accessible during such operation for directing fluid fuel through said forward wall into said combustion chamber generally toward the rear end thereof for supplying at least a major portion of the heat requirements of said furnace.

11. A glass melting furnace, comprising a tank for containing a single, substantially uninterrupted body of molten glass, means including a rear wall, side walls, a forward wall and a crown forming a combustion chamber above said tank, means for supplying glass making materials to said tank adjacent to the rear end thereof, means for supplying combustion-supporting air through said rear wall and in a direction toward the front end of said combustion chamber, means for the withdrawal of products of combustion from said combustion chamber through said rear wall, so that gases flow in a substantially U-shaped path through said combustion chamber, a forehearth having a channel through which molten glass passes from the body thereof in said tank to a point of use, passage means including a submerged throat beneath said forward wall communicating directly with the lower portion of said body of glass and a substantially vertical passage directly connecting said throat with the channel in said forehearth, whereby the outside of said forward wall and the portion of said forehearth above said vertical passage are accessible during furnace operation and are directly exposed to the atmosphere, burner means accessible during such operation for directing fluid fuel through said forward wall into said combustion chamber and generally toward the rear end thereof, and a vertically disposed stirring device extending into the glass flowing through said vertical passage for mechanically stirring and homogenizing the glass during its flow to the forehearth, said stirring device projecting upwardly above the forehearth for connection to driving means therefor.

JEWELL R. HANSON.

REFERENCES CITED

The following references are of record in the file of this patent:

UNITED STATES PATENTS

| Number | Name | Date |
| --- | --- | --- |
| 1,034,824 | Owens | Aug. 6, 1912 |
| 1,035,865 | Dixon et al. | Aug. 20, 1912 |
| 1,539,879 | Soderstrom | June 2, 1925 |
| 1,916,668 | Howard | July 4, 1933 |
| 1,937,321 | Howard | Nov. 28, 1933 |
| 2,016,945 | Paxton et al. | Oct. 8, 1935 |
| 2,354,324 | Longenecker | July 25, 1944 |
| 2,467,809 | Cannon, Jr. et al. | Apr. 19, 1949 |

FOREIGN PATENTS

| Number | Country | Date |
| --- | --- | --- |
| 41,254 | France | Dec. 2, 1932 |
| 65,715 | Norway | Jan. 25, 1943 |
| 713,869 | Germany | Oct. 23, 1941 |